US006043451A

United States Patent [19]

Julien et al.

[11] Patent Number: 6,043,451

[45] Date of Patent: Mar. 28, 2000

[54] PLASMA SPRAYING OF NICKEL-TITANIUM COMPOUND

[75] Inventors: Gerald J. Julien, Puyallup, Wash.; Albert Sickinger, Irvine; Gary A. Hislop, Lake Forest, both of Calif.

[73] Assignee: ProMet Technologies, Inc., Laguna Hills, Calif.

[21] Appl. No.: 09/188,048

[22] Filed: Nov. 6, 1998

Related U.S. Application Data

[60] Provisional application No. 60/064,734, Nov. 6, 1997.

[51] Int. Cl.[7] .......... B23K 10/00

[52] U.S. Cl. .......... 219/121.47; 219/76.16; 219/121.59; 219/121.43; 427/576; 427/456

[58] Field of Search .......... 219/121.47, 76.16, 219/76.15, 121.59, 121.43, 121.4; 204/298.12, 298.35; 428/34.7; 427/469, 446, 576, 456

[56] References Cited

U.S. PATENT DOCUMENTS 3,839,618 10/1974 Muehlberger .
4,328,257 5/1982 Muehlberger .
4,689,468 8/1987 Muehlberger .
4,740,112 4/1988 Muehlberger .
4,808,042 2/1989 Muehlberger .
4,877,640 10/1989 Muehlberger .
5,225,655 7/1993 Muehlberger .
5,298,835 3/1994 Muehlberger .

OTHER PUBLICATIONS

"Processing and Properties of Arc–Sprayed Shape Memory Effice NiTi" by Jardine, Field and Herman.

"Cavitation–Erosion Resistance of Thick–Film Thermally Sprayed NiTi" by Jardine, Horan and Herman; 1991.

*Primary Examiner*—Mark Paschall
*Attorney, Agent, or Firm*—Small Larkin, LLP

[57] ABSTRACT

A process for diffusion bonding a coating of Nitinol intermetallic compound to a surface of a metallic substrate includes heating and cleaning the surface of the substrate to a metallurgically clean condition by creating a plasma arc in a plasmatron and partially ionizing and heating a stream of inert gas in the plasma arc. The stream of partially ionized gas from the plasmatron is directed to the surface of the substrate to remove oxides and other contaminants from the surface. Nitinol powder is entrained in a mixture of hydrogen and argon gasses heated and ionized in the plasmatron, thereby heating the powder to a partially molten state. The partially molten power is ejected in the gas mixture from the plasmatron at high velocity and impacts against the metallurgically clean heated substrate surface to produce a diffusion bond between the Nitinol intermetallic compound and the metal substrate.

17 Claims, 2 Drawing Sheets

PLASMA SPRAYING OF NICKEL-TITANIUM COMPOUND

This Application relies on Provisional Application 60/064,734 filed Nov. 6, 1997.

This invention pertains to formation of coatings, thin films and built-up parts of nickel-titanium intermetallic compounds by plasma deposition.

BACKGROUND OF THE INVENTION

Designers of mechanical systems have long been looking for functional improvements in the performance of modern materials in the areas of corrosion and erosion resistance and vibration damping, sometimes in the same part. For example, the leading edge of a helicopter rotor is subject to erosion by impact with airborne particles such as sand, and corrosion under the influence of airborne corrosive agents such as ocean salt water, especially in areas where the protective coatings have been stripped away by erosion. In addition, vibration of parts in a helicopter rotor present fatigue and control problems to designers. The ability to provide erosion and corrosion resistance to reduce or eliminate the destructive influence of erosion and corrosion, and the property of vibration damping in the leading edge component to eliminate this destructive vibration would be an extremely welcome development in the helicopter industry, as well as many other industries.

SUMMARY OF THE INVENTION

Accordingly, it is an object of this invention to provide an improved process for making components, and the components themselves, that have erosion and corrosion resistance and having damping properties. Another object of this invention is to provide an improved process for diffusion bonding a nickel-titanium intermetallic compound to a surface of a substrate such as aluminum or steel. Still another object of this invention is to provide inexpensive thin films of nickel-titanium intermetallic compound, and for providing a process for making such films. Yet another object of this invention is to provide inexpensive thin wall tubing of nickel-titanium intermetallic compound and an improved process for making such tubing.

These and other objects of the invention are attained in a process for plasma deposition of Nitinol on a substrate such as aluminum or graphite/epoxy composite including entraining a powder made of small particles of nickel-titanium intermetallic compound in a mixture of hydrogen and argon gasses heated and ionized in a plasmatron, thereby heating the powder to a partially molten state, and ejecting the partially molten powder in the gas mixture from the plasmatron at high velocity. The partially melted powder impacts against the substrate surface where it freezes to produce a deposition of nickel-titanium intermetallic compound on the substrate.

DESCRIPTION OF THE DRAWINGS

The invention and its many attendant objects and advantages will become better understood upon reading the description of the preferred embodiment in conjunction with the following drawings, wherein.

DESCRIPTION OF THE PREFERRED EMBODIMENTS

Figure 1:
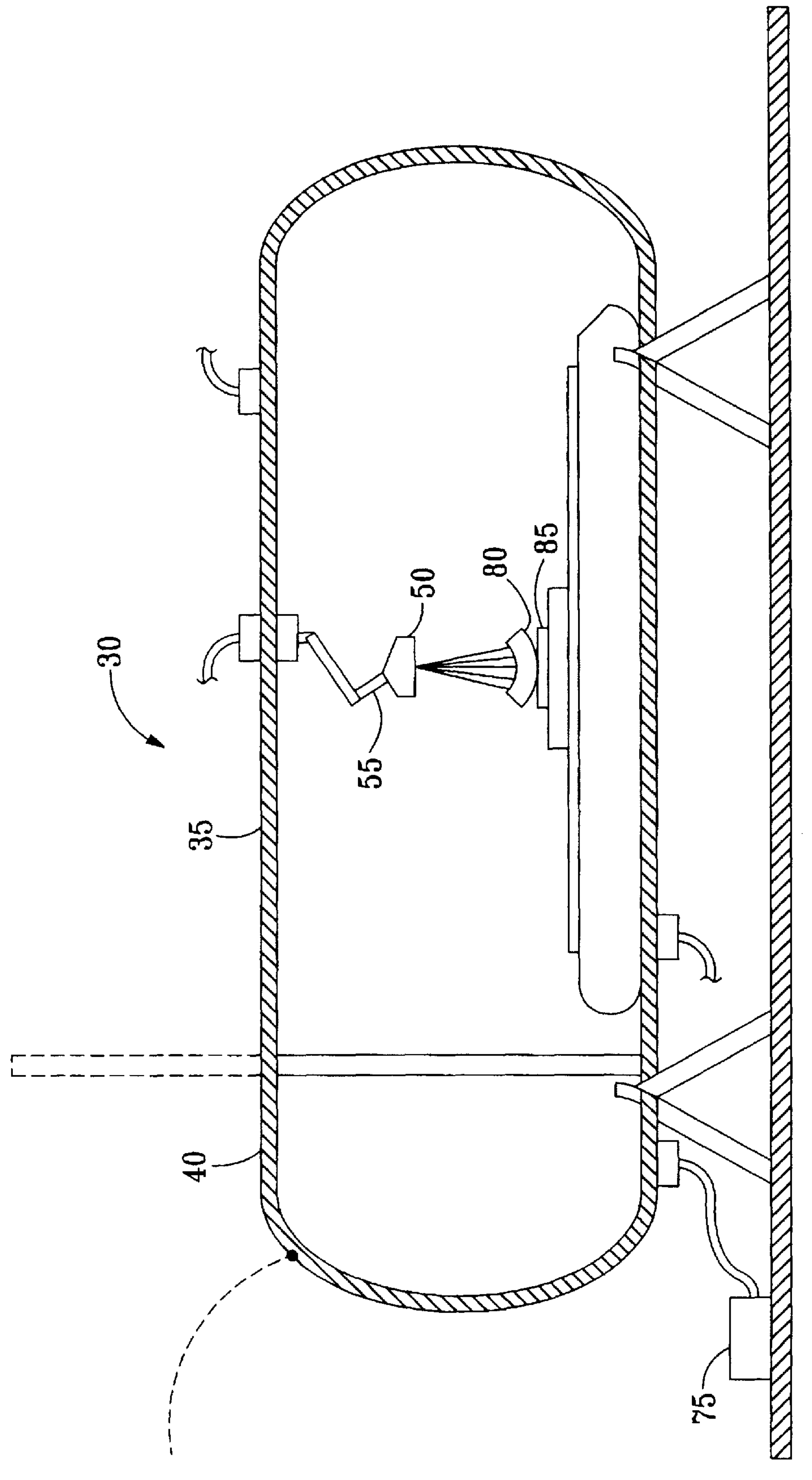
FIG. 1 is a sectional elevation of a low pressure plasma spray apparatus used in the process of this invention.

Turning now to the drawings, wherein like reference numerals designate like or corresponding parts, and more particularly to FIG. 1 thereof, an apparatus 30 is shown for plasma deposition of materials onto a substrate. The plasma spray machine 30, made by Electro-Plasma, Inc. in Irvine, Calif., is available now from Sulzer Metco Company in Switzerland. It is used primarily for depositing nickel alloys and other specialized material on turbine blades for protection from the high temperature erosion influences in jet turbine engines.

The plasma spray machine 30 includes a main chamber 35 within which a low pressure, inert atmosphere can be established. The enclosure includes a transfer chamber 40 through which parts can be passed into and out of the main chamber 35 without contaminating the atmosphere in the main chamber 35 or affecting the gas pressure therein. Gas feed and exhaust lines connect to fittings on the main chamber 35 and the transfer chamber 40 for exhausting and purging to establish the desired atmosphere composition and pressure.

A plasmatron 50 is disposed in the main chamber 35, preferably on a robotic arm 55 by which the plasmatron 50 can be manipulated remotely within the chamber 35 by controls outside the chamber. The plasmatron 50, shown schematically in FIG. 2, has a nozzle 60 having a conical cavity 65 within which a cathode 70 is suspended centrally, creating an annular passage 72 of about 0.150" between the cathode 70 and the wall of the conical cavity 65 of the annode 60.

In operation, the main chamber 35 is evacuated to a pressure of about 50 millitorr through one of the gas lines by a vacuum pump 75, and then backfilled with clean (99.995% pure) nitrogen or argon gas, or gas mixtures of argon/hydrogen or argon/helium, to 300 torr. The chamber 35 is again evacuated to 50 millitorr and recharged with inert or non-reactive gasses such as argon or a mixture of argon and helium or argon and hydrogen to an operating pressure of about 30 torr. The hydrogen moiety is believed to function as an oxygen getter in the chamber to reduce the oxygen content in the Nitinol coating to negligible amounts, on the order of 15–30 ppm or less.

One or more parts 80 are entered into the chamber 35 through the transfer chamber. This transfer chamber was evacuated each time between 50 to 100 millitorr and backfilled to 100 torr, evacuated again and backfilled to 30 torr before opening the transfer valve. A part 80 previously put into the chamber is manipulated into position by remotely operable manipulating equipment 85 under the plasmatron 50 in preparation for the coating operation.

Figure 2:
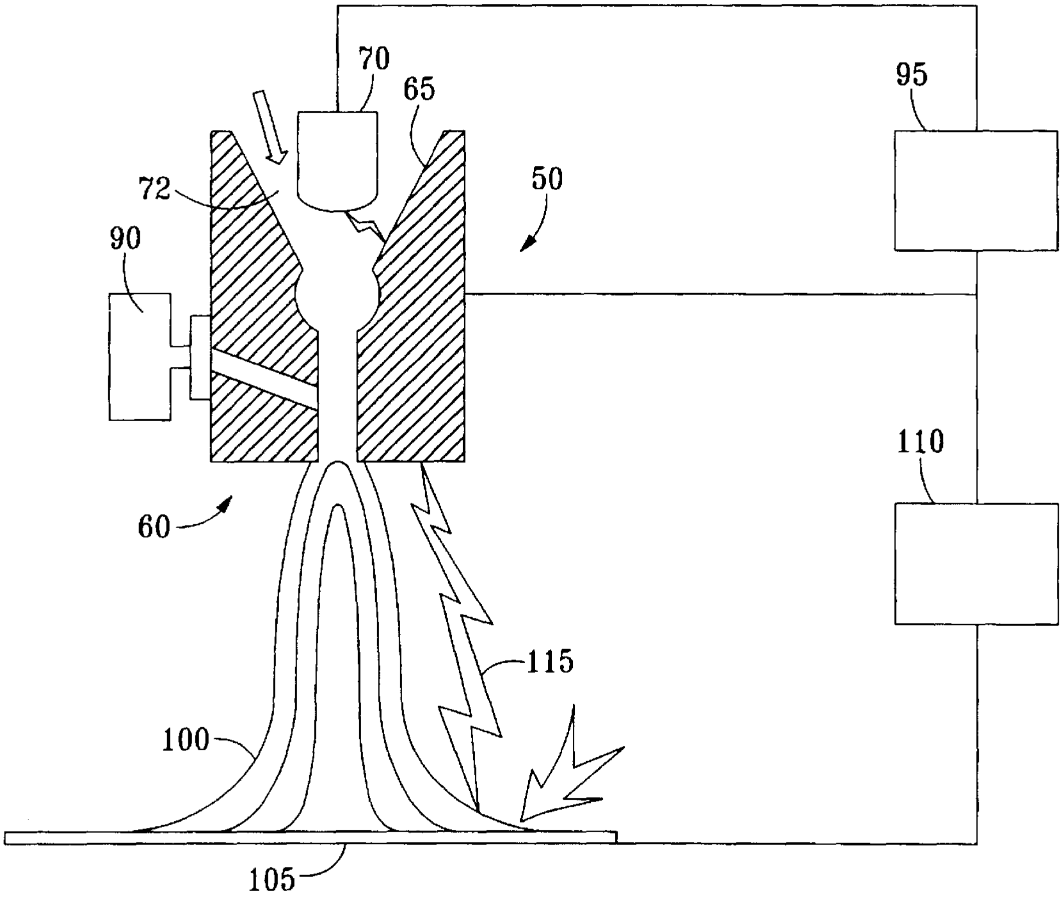
FIG. 2 is a schematic sectional elevation of a plasmatron and a plasma stream to a substrate.

Two powder feeders (only one of which is illustrated in FIG. 2) of known design and commercially available in the LPPS system are filled with Nitinol powder and evacuated to 50 millitorr, then backfilled with pure argon to 4 psig. This process is repeated two more times to minimize the oxygen content on the powder feeders and in the powder. The powder is a gas atomized Nitinol powder in the range of 10–45 micrometer diameter. It is commercially available from Special Metals Corporation in New Hartford, N.Y.

A plasma gas consisting of a mixture of 82% argon and 18% hydrogen is flowed through the annular passage 72 at a rate of about 150 scfh argon and 34 scfh hydrogen. A DC plasma power supply 95 is energized to create an arc in the passage 72, and 71.5 kW of power is applied at 1300 amp and 55 volts. The plasma gas exits the nozzle 60 in a plasma gas stream at high temperature and velocity and impinges on a part or substrate 105 positioned about 17 inches below the nozzle 60. The temperature of the part surface rises quickly to about 400° C. whereupon a transfer arc power supply 110 is energized to cause electrons to flow in a reverse transfer arc 115 out of the heated substrate surface and flow countercurrent through the plasma gas stream 100 to the nozzle 60 or to a separate electrode coupled to the plasma gas stream 100. The action of the reverse transfer arc 115 preferentially discharges at the substrate surface where oxides and other contaminants exist, and acts to vaporize and otherwise eliminate the contaminants until the substrate surface is metallurgically clean.

The powder feeders 90 are now turned on to feed powder at a rate of about 50 grams/minute with a carrier gas flowing at a rate of 15 scfh. The powder is entrained in the plasma gas flow 100 and ejected from the nozzle 60 at supersonic speeds. It travels with the plasma gas stream in a diverging or conical flow and impacts against the substrate surface at high speed. The high energy and partially melted state of the powder particles and the extremely clean substrate surface result in diffusion of the powder particles when they impact and flatten against the substrate surface. The diffusion of the powder particles into the substrate surface results in an intimate bond between the Nitinol powder coating and the substrate surface. Diffusion bonding refers to metallurgical joining of two pieces of metal by molecular or atomic co-mingling at the faying surface of the two pieces when they are heated and pressed into intimate contact for a sufficient length of time. It is a solid state process resulting in the formation of a single piece of metal from two or more separate pieces, and is characterized by the absence of any significant change of metallurgical properties of the metal, such as occurs with other types of joining such as brazing or welding, and little or no metallurgical differentiation across the junction zone.

For flat stainless steel substrates, the remotely operable manipulating equipment 85 is operated to move the part 80 under the plasmatron 50 at about 207 inches/minute. Round and flat aluminum substrates are rotated at about 80 RPM. For a 6"×6" sample, the Nitinol coating accumulates to a thickness of about 0.004" in about 6 minutes.

After coating, the samples are returned into the transfer chamber and allowed to cool for a period of 5 min under Argon atmosphere. The part temperature during and after coating was in excess of about 400° C.

Thin film forms of Nitinol can be made by deposition the Nitinol by plasma spray on a metal or ceramic substrate surface such as stainless steel or alumina that has not been cleaned and heated as described above. The surface of the substrate is polished to produce a surface to which the plasma deposited partially molten Nitinol power will not adhere, and selected portions of the polished substrate are roughened by fine grit blasting. A grid of about 1.5 inch squares separated by grit blasted lines about ¼" wide was found to hold the Nitinol film as it builds to the desired thickness (about 0.004") without being blown off the substrate by the plasma gas stream, but was easily separated from and lifted off the substrate after deposition and cooling. Alternatively or in addition to polishing the substrate surface, the surface could be treated with a release material such as boron nitride to prevent bonding of the Nitinol with the substrate surface. Nitinol bonded to an intermediate layer may be needed when bonding to low coefficient of thermal expansion material like ceramic is required.

This invention makes possible the bonding of a Nitinol heater element to a part surface, even a conductive metal substrate surface, without shorting the heater element. The part surface is first cleaned in the manner described above, and the first powder feeder 90 is energized to feed powder made of an electrically insulating, thermally conducting material, such as aluminum oxide, into the plasma stream. A layer of that material is deposited on and diffusion bonds to the substrate, preferably in a pattern desired for the electrical heater element to create an electrical insulating layer. Such a pattern could be a serpentine pattern, for example, and could be produced by a mask over the part surface. When a sufficient layer of the alumina has been build up, the powder feeder 90 is turned off and the other powder feeder (not shown) is energized to feed Nitinol powder into the plasma stream. The Nitinol powder is deposited over the alumina layer and diffusion bonds to the alumina. Contacts can be attached to the Nitinol for electrical feed wires, or the substrate itself can be formed in tabs at the two ends of the electrical heater pattern for attachment of electrical power leads.

Wire-fed plasmatrons are contemplated in place of powder feed plasmatron 50 shown in FIG. 2. Particles of a desired size are created in a wire-fed plasmatron. The size of the Nitinol particle is controlled by vibrating the wire as it is fed into the plasma stream by an ultrasonic transducer at a frequency and amplitude, and by the wire gauge.

Potential applications for high transition temperature Nitinol coatings:

1. Switches and relays (replacements for solenoids).
2. Shape control (airfoils, mirrors and structural members).
3. Vibration damping devices.
4. Coatings on structural components (aircraft leading edge components and spacecraft structures).
5. Mirrors (for aircraft, automobiles, ships and lasers).
6. Heater elements.
7. Impellers on pumps.
8. Seals (for low temperature applications).
9. Actuators (hydraulic and air valves).

Potential applications for low transition temperature (superelastic) Nitinol coating:

1. Coatings on structural components to prevent corrosion (Navy ships, weapons, etc.).
2. Coatings to reduce erosion on vehicles (water craft and spacecraft).
3. Linings for piping for corrosion resistance (salt water piping and concrete pump lines).
4. Built-up parts such as medical applications (stents for heart and prostrate insertion) or tubing (thin wall).
5. Coatings for food processing equipment.
6. Aerospace applications (coatings for landing gears on aircraft, wind leading edge on helicopters, aircraft, etc.).
7. Military applications (coatings on above deck hardware for Navy ships).
8. Sensors (vibration, displacement and temperature).

Some applications of the low transition temperature Nitinol will require the development of processes to put some cold work into the material to develop superelastic properties. This would be desirable for all medical and tubing applications. Although some of the low transition temperature Nitinol materials have moderate hardness (15 to 25 Rc), they are not considered to be usable for bearing surfaces. However, due to the excellent erosion and corrosion resistance characteristics, they would be very usable for leading edge applications.

Type 60 Nitinol is an intermetallic compound having 60% by weight nickel and 40% by weight titanium. It can be plasma sprayed. This alloy is very hard and with the proper heat treat can reach 62 Rc. This material can be used in areas that require high hardness and corrosion protection. Potential applications include:

Bearing races

Machinery rails (ways).

Nozzle Coatings (water jet).

Obviously, numerous modifications and variations of the preferred embodiments described above are possible and will become apparent to those skilled in the art in light of this specification. For example, many functions and advantages are described for the preferred embodiments, but in many uses of the invention, not all of these functions and advantages would be needed. Therefore, we contemplate the use of the invention using fewer than the complete set of noted features, benefits, functions and advantages. Moreover, several species and embodiments of the invention are disclosed herein, but not all are specifically claimed, although all are covered by generic claims. Nevertheless, it is our intention that each and every one of these species and embodiments, and the equivalents thereof, be encompassed and protected within the scope of the following claims, and no dedication to the public is intended by virtue of the lack of claims specific to any individual species. Accordingly, it is expressly intended that all these embodiments, species, modifications and variations, and the equivalents thereof, are to be considered within the spirit and scope of the invention as defined in the following claims, wherein we claim:

What is claimed is:

1. A process for deposition of a nickel-titanium intermetallic compound onto a surface of a substrate, comprising:

heating and ionizing a mixture of non-reactive gasses in a plasmatron to form a plasma stream;

entraining in said mixture powder particles made of an electrically insulating, thermally conducting material, thereby heating said particles to a partially molten state;

ejecting said partially molten particles in said mixture from said plasmatron at high velocity and impacting said partially molten powder particles against a substrate surface to produce an electrical insulating layer on said substrate;

after said insulating layer has been formed, entraining nickel-titanium intermetallic compound in said mixture, thereby heating said nickel-titanium intermetallic compound to a partially molten state; and ejecting said partially molten intermetallic compound in said mixture from said plasmatron at high velocity and impacting said partially molten intermetallic compound to produce a deposition of said nickel-titanium intermetallic compound on said insulating layer.

2. A process as defined in claim 1, further comprising:

attaching electrically conductive contacts to said deposition of nickel-titanium intermetallic compound.

3. A process as defined in claim 1, further comprising:

heating and cleaning said surface to a metallurgically clean condition prior to entraining said electrically insulating, thermally conducting material by a. creating a plasma arc in said plasmatron;

b. flowing a stream of partially ionized gas from said plasmatron to said surface;

c. establishing a voltage between said substrate and an electrode conductively coupled to said stream of partially ionized gas; and d. flowing electrons from said substrate to said electrode through said stream, thereby removing oxides and other contaminants from said surface.

4. A process as defined in claim 1, wherein:

said nickel-titanium intermetallic compound is entrained within said plasma stream in the form of powder.

5. A process as defined in claim 1, wherein:

said nickel-titanium intermetallic compound is entrained within said plasma stream in the form of globules melted and shaken from wires of said nickel-titanium intermetallic compound fed into said plasma stream.

6. A process for deposition of a nickel-titanium intermetallic compound comprising:

providing a plasma stream of partially ionized, non-reactive gasses;

providing a substrate and a layer of release material on said substrate, said layer capable of preventing a deposition of nickel-titanium material from bonding to said substrate;

entraining in said plasma stream said nickel-titanium intermetallic compound to form a deposition of said compound on said release layer on said substrate; and removing said deposition from said substrate after formation of said deposition.

7. A process as defined in claim 6, wherein:

said deposition is a thin foil of said nickel-titanium compound.

8. A process as defined in claim 7, wherein:

said release material is a polished surface of a stainless steel; and said step of providing a substrate includes selectively roughening portions of said substrate surface to produce surface regions to which said particles will adhere with sufficient tenacity to not be blown off by said plasma stream.

9. A process as defined in claim 6, wherein:

said layer of release material on said substrate includes a layer of boron nitride.

10. A process for deposition of a nickel-titanium intermetallic compound comprising:

providing a plasma stream of partially ionized, non-reactive gasses;

providing a substrate;

depositing an intermediate layer of material on the substrate said intermediate layer being of a material having a coefficient of thermal expansion between the coefficient of thermal expansion of said substrate and the coefficient of thermal expansion of said nickel-titanium intermetallic compound.

11. A process as defined in claim 6, further comprising:

providing the substrate in the form of an elongated mandrel having a cross-sectional shape of a desired internal cross-section shape of tubing; and the step of removing said deposition includes shrinking said mandrel away from the interior walls of said deposition; and axially separating said tubular deposition and said mandrel;

whereby thin wall nickel-titanium tubing is produced.

12. A process as defined in claim 11, wherein:

said shrinking of said mandrel away from the interior walls of said tubular deposition includes differential thermal expansion and contraction of said deposition and said mandrel.

13. A process as defined in claim 11, wherein:

said nickel-titanium tubing is incrementally moved and collected on a take-up reel after each deposition period when nickel-titanium compound is is deposited on said mandrel.

14. A structure having an erosion and corrosion resistant surface, comprising:

a structural component, an intermediate layer and a nickel-titanium deposition layer;

the structural component made of aluminum or steel and having a metallurgically clean boundary region to which is diffusion bonded a layer of nickel-titanium intermetallic compound; and the intermediate layer of material positioned between the structural component and the deposition layer and having a coefficient of thermal expansion between the coefficient of thermal expansion of the structural component and the coefficient of thermal expansion of the nickel-titanium deposition layer.

15. A structure as defined in claim 14, wherein said intermediate layer is boron nitride to provide a yield layer to prevent damage to said base material or said nickel-titanium layer in the event of thermal extremes.

16. A structure comprising:

a structural component made of a thermally conductive metal such as steel or aluminum and having a surface on which a heater element is to lie;

a thermally conductive, electrically insulating material diffusion bonded to said surface in an area covering a pattern over which said heater element will lie;

a layer of nickel-titanium intermetallic compound applied and diffusion bonded to said thermally conductive, electrically insulting material by plasma deposition in a predetermined pattern, said layer forming said heater element;

electrical contacts contacting said layer and adapted for connecting said layer to a source of electrical power;

whereby electrical current may be conducted through said layer to resistively heat said structural component through said pattern while remaining electrically insulated from said structural component.

17. A structure as defined in claim 16, wherein:

said thermally conductive, electrically insulating material includes aluminum oxide.

* * * * *